United States Patent
Bran De León et al.

(10) Patent No.: US 11,728,071 B2
(45) Date of Patent: Aug. 15, 2023

(54) CABLE ASSEMBLY WITH BUNDLING ARRANGEMENT

(71) Applicant: CommScope Technologies LLC, Hickory, NC (US)

(72) Inventors: Oscar Fernando Bran De León, Belle Plaine, MN (US); Thomas Marcouiller, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/872,392

(22) Filed: Jul. 25, 2022

(65) Prior Publication Data

US 2023/0013871 A1 Jan. 19, 2023

Related U.S. Application Data (63) Continuation of application No. 17/112,163, filed on Dec. 4, 2020, now Pat. No. 11,398,325.

(Continued)

(51) Int. Cl.
*H01B 9/00* (2006.01)
*G02B 6/44* (2006.01)
*H01B 7/18* (2006.01)

(52) U.S. Cl.
CPC ........... *H01B 9/005* (2013.01); *G02B 6/4429* (2013.01); *G02B 6/4478* (2013.01); *H01B 7/1895* (2013.01)

(58) Field of Classification Search
CPC .... G02B 6/4478; G02B 6/4429; G02B 6/223; H01B 7/1895; H01B 7/285; H01B 9/005;

(Continued)

(56) References Cited

U.S. PATENT DOCUMENTS

| 5,768,455 A | 6/1998 | Konik |
| 5,903,693 A * | 5/1999 | Brown ................. G02B 6/4471 385/100 |

(Continued)

FOREIGN PATENT DOCUMENTS

| FR | 2 598 586 A1 | 11/1987 |
| JP | 10-322858 A | 12/1998 |

(Continued)

OTHER PUBLICATIONS

International Search Report and Written Opinion for Application No. PCT/US2020/063412 dated Mar. 26, 2021.

*Primary Examiner* — Hoa C Nguyen
*Assistant Examiner* — Amol H Patel
(74) *Attorney, Agent, or Firm* — Merchant & Gould P.C.

(57) ABSTRACT

The present disclosure relates to a cable assembly including a sleeve and a plurality of cables that extend through the sleeve. The cable assembly also includes a grommet positioned within the sleeve at a location offset from one end of the sleeve. The grommet forms a dam location. The cable assembly further includes a bonding material at least partially filling a region of the sleeve located between the dam location and the end of the sleeve. The bonding material bonds the fiber optic cables and the grommet relative to the sleeve. The cables extend through the grommet and the bonding material and include break-out portions that extend outwardly beyond the end of the sleeve.

21 Claims, 13 Drawing Sheets

Related U.S. Application Data (60) Provisional application No. 62/944,609, filed on Dec. 6, 2019.

(58) Field of Classification Search
CPC .. H02G 15/003; H02G 15/007; H02G 15/013; H02G 15/046; H02G 15/18
See application file for complete search history.

(56) References Cited

U.S. PATENT DOCUMENTS

| | | | |
|---|---|---|---|
| 6,010,134 A | 1/2000 | Katoh | |
| 6,297,454 B1 | 10/2001 | Gareis | |
| 6,389,214 B1 | 5/2002 | Smith et al. | |
| 6,748,146 B2 | 6/2004 | Parris | |
| 6,890,464 B2 | 5/2005 | Suzuki | |
| 8,532,490 B2 | 9/2013 | Smith et al. | |
| 9,057,862 B2 | 6/2015 | Strasser et al. | |
| 9,078,287 B2 | 7/2015 | Khemakhem et al. | |
| 9,182,564 B2 | 11/2015 | Strasser et al. | |
| 10,310,192 B2 | 6/2019 | Kowalczyk et al. | |
| 10,908,377 B1 | 2/2021 | Rodman et al. | |
| 11,398,325 B2 | 7/2022 | Bran De León et al. | |
| 2003/0210875 A1* | 11/2003 | Wagner | G02B 6/4472 385/100 |
| 2005/0158541 A1 | 7/2005 | Tanaka | |
| 2013/0014974 A1* | 1/2013 | Burke | H02G 15/013 174/135 |
| 2014/0079359 A1 | 3/2014 | Yu et al. | |
| 2014/0140664 A1* | 5/2014 | Islam | G02B 6/4471 385/86 |
| 2015/0021068 A1* | 1/2015 | Bernhardt | G02B 6/4471 264/261 |
| 2015/0168657 A1 | 6/2015 | Islam | |
| 2015/0355429 A1 | 12/2015 | Villegas et al. | |
| 2017/0323702 A1 | 11/2017 | Heipel et al. | |
| 2017/0371121 A1* | 12/2017 | Marchek | G02B 6/4471 |
| 2018/0011276 A1* | 1/2018 | Marchek | G02B 6/4472 |
| 2018/0061528 A1* | 3/2018 | Islam | G02B 6/4416 |
| 2019/0004273 A1* | 1/2019 | Faulkner | G02B 6/4472 |
| 2019/0006834 A1* | 1/2019 | Komori | H02G 15/046 |
| 2019/0257460 A1* | 8/2019 | Hernandez | H02G 3/088 |

FOREIGN PATENT DOCUMENTS

| | | |
|---|---|---|
| JP | 3214396 B2 | 10/2001 |
| JP | 2002-58140 A | 2/2002 |
| JP | 2002-374611 A | 12/2002 |
| JP | 2003-16859 A | 1/2003 |
| JP | 2004-146254 A | 5/2004 |
| JP | 4043914 B2 | 2/2008 |

* cited by examiner

CABLE ASSEMBLY WITH BUNDLING ARRANGEMENT

CROSS REFERENCE TO RELATED APPLICATION

This application is a continuation of U.S. patent application Ser. No. 17/112,163, filed Dec. 4, 2020, which claims the benefit of provisional application Ser. No. 62/944,609, filed Dec. 6, 2019, which is incorporated herein by reference in its entirety.

TECHNICAL FIELD

The present disclosure relates generally to cable assemblies. More particularly, the present disclosure relates to cable assemblies including fiber optic cables and electrical power cables.

BACKGROUND

Remote radio heads (RRH) are now commonly used in distributed base station architectures for transmitting signals from antenna towers. Remote radio heads are typically mounted adjacent the top of antenna towers. To provide connectivity and power to remote radio heads, it is common to route optical fibers and electrical power conductors up the antenna towers to the remote radio heads. This is often accomplished through the use of hybrid fiber optic cables which include electrical conductors and optical fibers contained within one cable jacket and integrated within a core within the cable jacket.

SUMMARY

One aspect of the present disclosure relates to a cable assembly including a sleeve having a length that extends from a first end to a second end. The cable assembly also includes power cables that extend through the length of the sleeve. Each of the power cables includes an electrical conductor and a power cable jacket that surrounds the electrical conductor. The cable assembly also includes at least one fiber optic cable that extends through the length of the sleeve. The fiber optic cable includes a plurality of optical fibers and at least one strength element. The fiber optic cable also includes a fiber optic cable jacket that surrounds the optical fibers and the strength element. The cable assembly further includes a grommet positioned within the sleeve at a location offset from the first end of the sleeve. The grommet forms a dam location within the sleeve. The cable assembly additionally includes a bonding material at least partially filling a region of the sleeve located between the dam location and the first end of the sleeve for bonding the fiber optic cable, the power cables and the grommet relative to the sleeve. The power cables and the fiber optic cable extending through the grommet and the bonding material and including break-out portions that extend outwardly beyond the first end of the sleeve.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclose herein are based.

BRIEF DESCRIPTION OF THE DRAWINGS

The following drawings are illustrative of particular examples of the present disclosure and therefore do not limit the scope of the present disclosure. Examples of the present disclosure will hereinafter be described in conjunction with the appended drawings, wherein like numerals denote like elements.

DETAILED DESCRIPTION

Various examples will be described in detail with reference to the drawings, wherein like reference numbers represent like parts and assemblies throughout the several views.

One aspect of the present disclosure relates to a cable assembly having a bundling arrangement that groups together a plurality of individual cables including at least one fiber optic cable and a plurality of separate power cables such that the individual cables can be shipped and deployed as a unit. In certain examples, the cable assembly can include a sleeve that surrounds the individual cables. In certain examples, break-out portions of the cables can extend outwardly beyond an end of the sleeve. In certain examples, the cables can be secured to one end of the sleeve by a bonding material that at least partially fills an end region of the sleeve. In certain examples, a grommet can be positioned within the sleeve at a location offset from the end of the sleeve from which the break-out portions of the cables extend. The grommet can form a dam location within the sleeve for limiting the distance the bonding material can flow within the sleeve during application of the bonding material. In certain examples, the bonding material is a curable material that hardens over time. In certain examples, the bonding material can also form a cable bend protection feature (e.g., a strain relief boot) that projects outwardly from the end of the sleeve to protect the cables from over bending. In certain examples, the fiber optic cable can include at least 2, 4, 8, 12, 24, 36 or more optical fibers. In certain examples, the configuration of the cable assembly allows the cable assembly to be readily installed as a unit on an antenna tower. In certain examples, the break-out portions of the cables can be connected to remote radio heads either directly or through intermediate junction boxes and jumper cables. In certain examples, the optical fibers of the fiber optic cable can be terminated by single or multi-fiber connectors (e.g., hardened or non-hardened). In certain examples, the power cables can include DC power cables. In certain examples, the break-out portions of the cables facilitate connecting the cables to remote radio heads or junction boxes corresponding to remote radio heads, and an opposite end of the cable assembly can be cut to length as needed.

Figure 1:
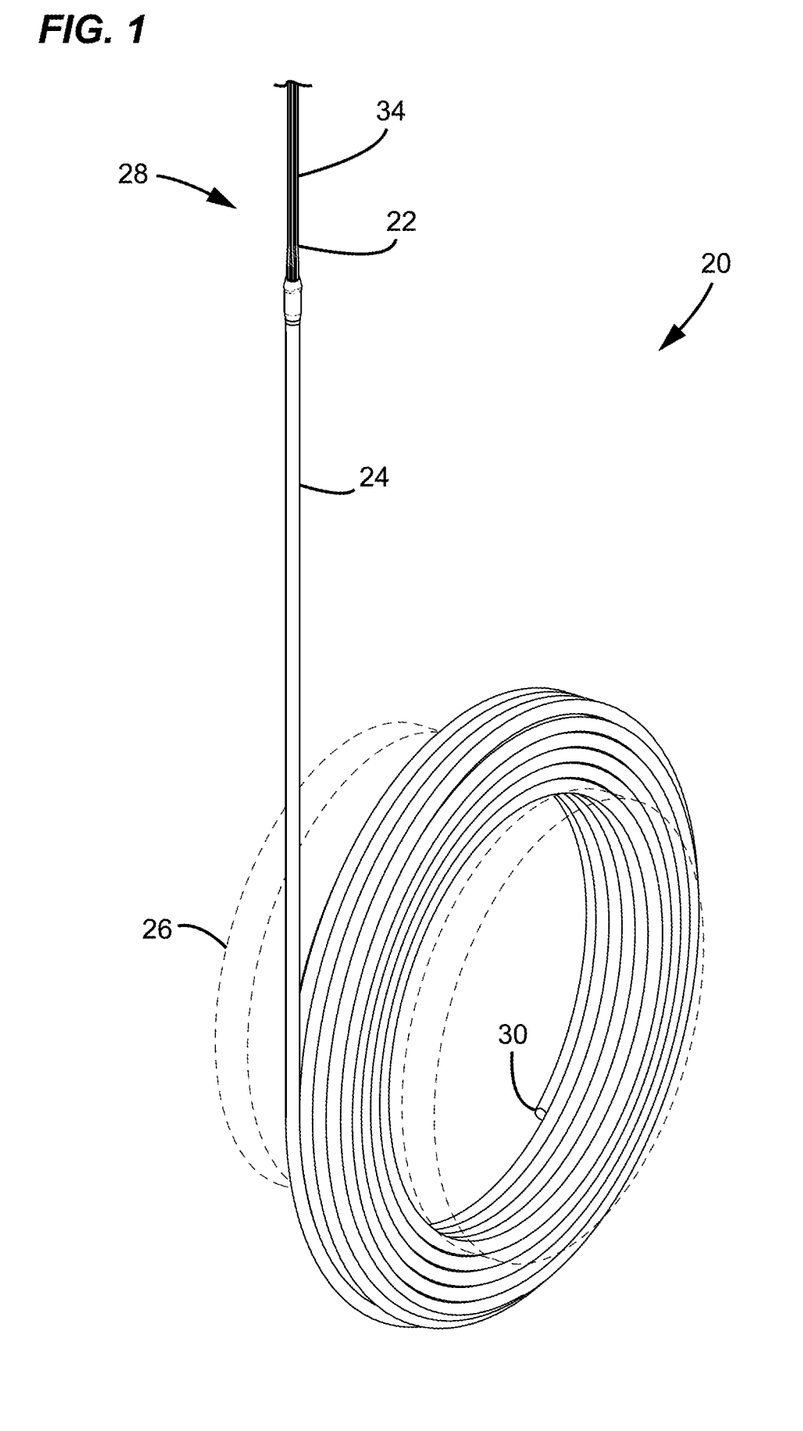
FIG. 1 depicts a cable assembly in accordance with the principles of the present disclosure, a majority of the cable assembly is shown coiled about a spool.
Figure 2:
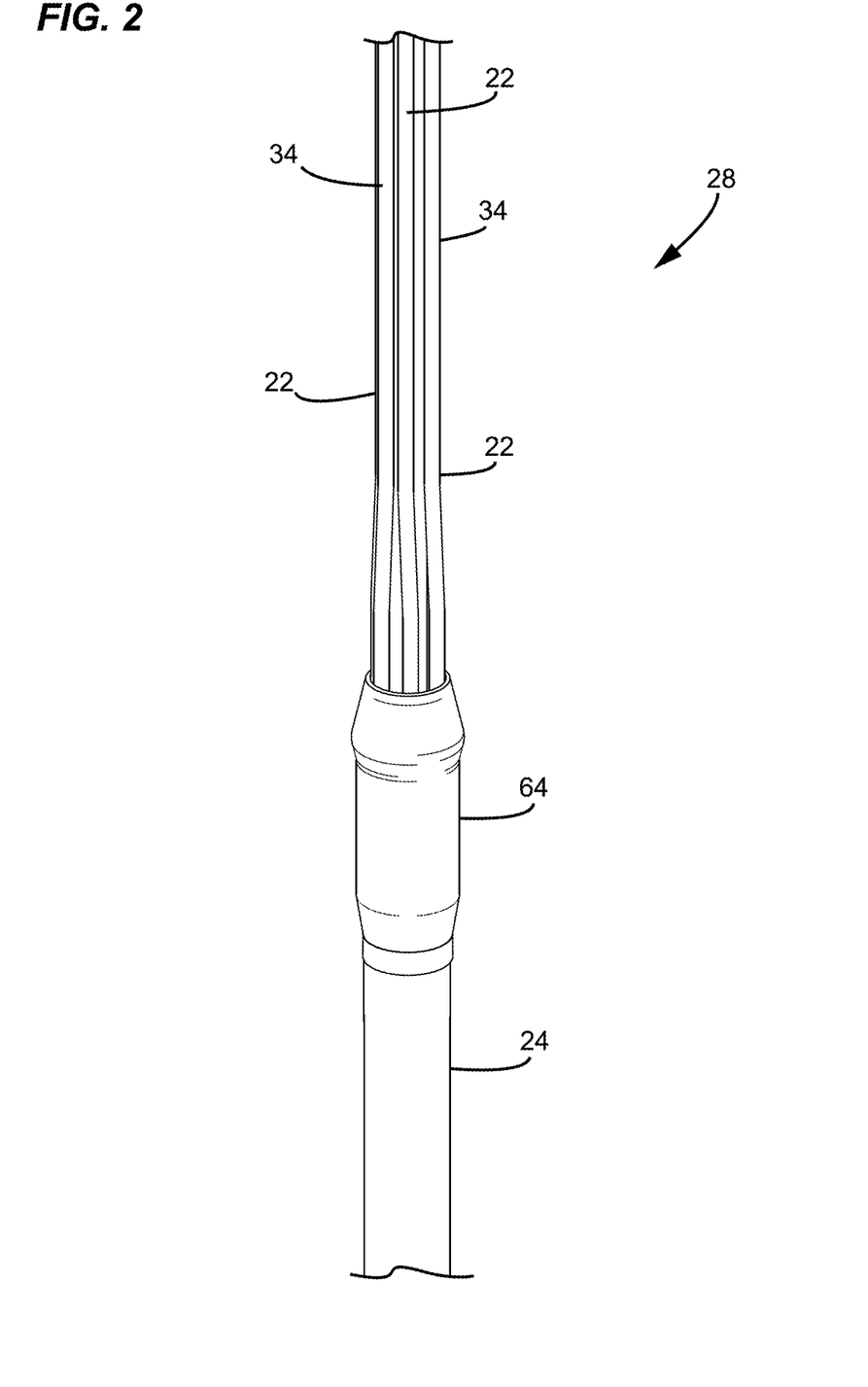
FIG. 2 is a perspective view showing a break-out end of the cable assembly of FIG. 1.

FIGS. 1 and 2 depict a cable assembly 20 in accordance with the principles of the present disclosure. The cable assembly 20 includes a plurality of individual cables 22 bound, grouped or bundled together by a sleeve 24. The cables 22 are each preferably separate, stand-alone cables each having their own jacket for providing individual sealing and protection. Because the cables 22 are stand-alone cables that are self-sealed, it is not necessary for the sleeve 24 to be environmentally sealed. Instead, the sleeve mainly provides a bundling function for grouping the cables 22 together such that the cables 22 can be handled, packaged and deployed together as a unit.

In the embodiment of FIG. 1, the sleeve 24 with the cables 22 therein is coiled about a spool 26. The cable assembly 20 is coiled about the spool 26 with a break-out end 28 of the cable assembly 20 located on the outside of the coil and an open end 30 at the inside of the coil. By pulling on the break-out end 28 while the spool 26 is on a mandrel or like device, the spool 26 can turn about the mandrel thereby allowing the sleeve 24 with the cables 22 to be paid out from the spool 26. In this way, the cables 22 can be deployed as a unit thereby facilitating the deployment process.

Figure 3:
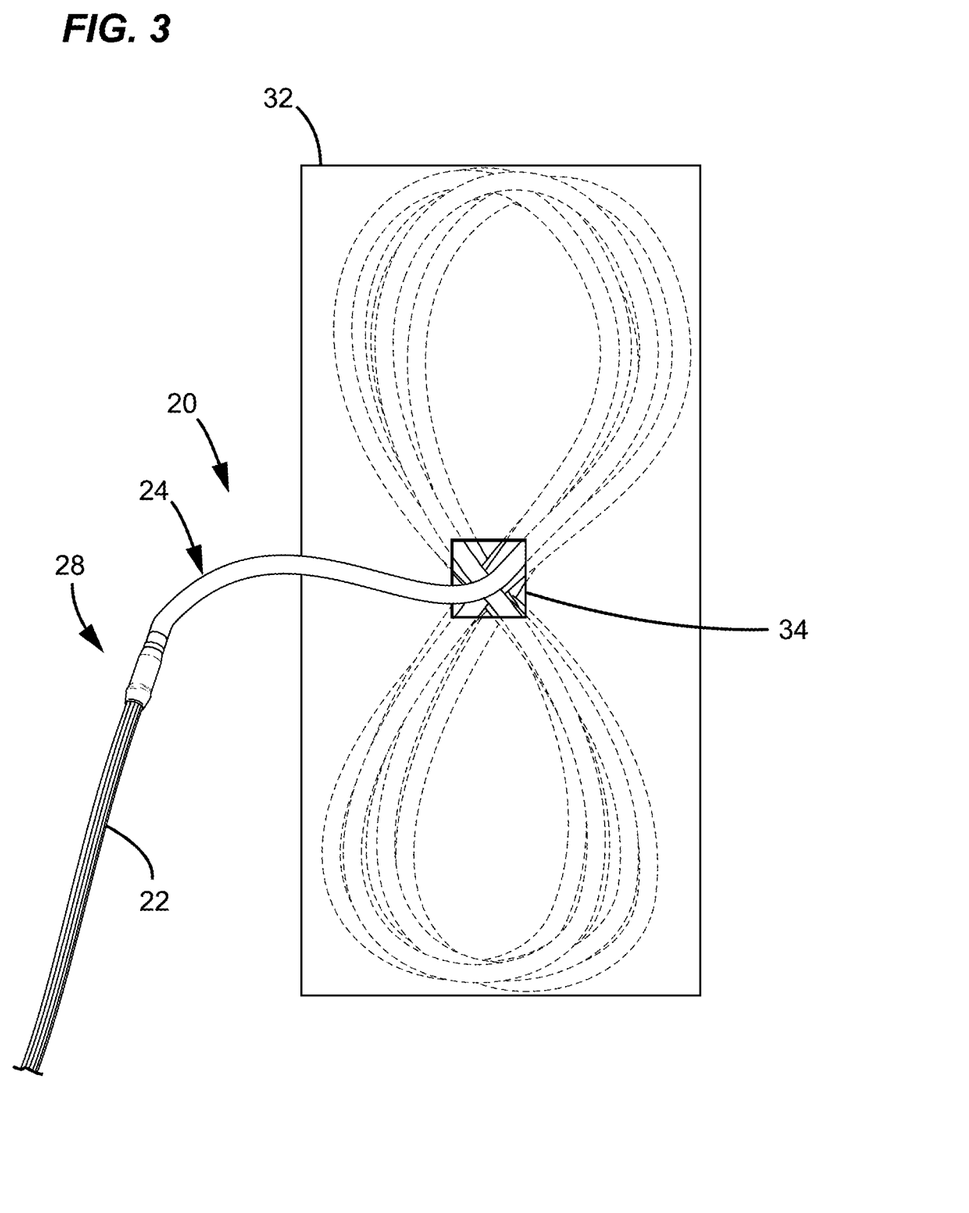
FIG. 3 depicts the cable assembly of FIG. 1 with a majority of the cable assembly packaged within a box.

FIG. 3 shows another packaging arrangement for the cable assembly 20. In the example of FIG. 3, the sleeve 24 with the cables 22 therein is packaged in a figure-8 pattern within a box 32. The break-out end 28 of the cable assembly 20 extends out through an opening 34 in the box 32. By pulling on the break-out end 28, the cable assembly 20 can be pulled from the box 32 for deployment. The figure-8 pattern of sleeve 24 within the box 32 eliminates the effect of twisting during deployment of the cable assembly 20.

Referring again to FIG. 1, the sleeve 24 has a length that extends from the break-out end 28 to the open end 30. Preferably, the cables 22 extend through substantially the entire length of the sleeve 24 and the sleeve 24 covers substantially the entire length of each of the cables 22. However, as shown at FIG. 1, break-out portions 34 of the cables 22 extend beyond the break-out end 28 of the sleeve 24 and are therefore not enclosed or encased within the sleeve 24. Instead, the break-out portions 34 extend axially beyond the break-out end 28 of the sleeve 24. It will be appreciated that the break-out portions 34 are preferably independently movable with respect to one another since the cables 22 are individual cables and the break-out portions 34 are not bound together by the sleeve 24.

Figure 19:
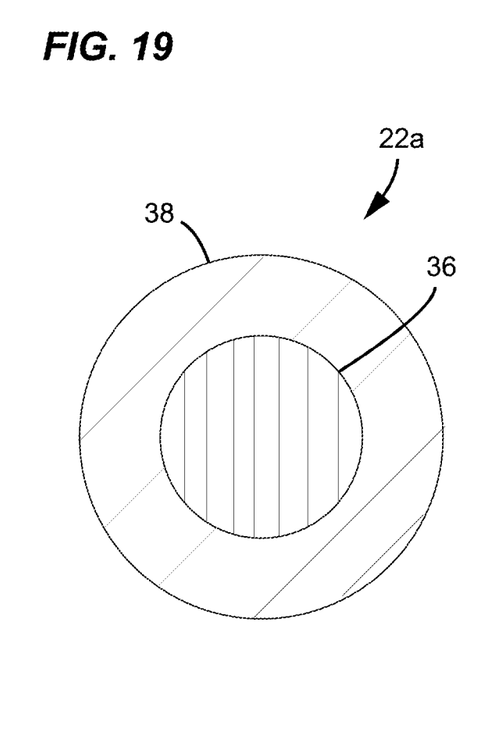
FIG. 19 is a cross sectional view of an example power cable that can be incorporated as part of cable assemblies in accordance with the principles of the present disclosure.

The cables 22 preferably include a plurality of power cables 22a (see FIGS. 5-8). FIG. 19 is a cross sectional view through one of the power cables 22a. Shown at FIG. 19, each of the power cables 22a includes an electrical conductor 36 surrounded by an insulating dielectric jacket 38. In certain examples, the electrical conductors 36 are made of a material having a composition that is suitable for conducting electricity. In a preferred example, the electrical conductors have a composition that include copper. In will be appreciated that the conductors 36 can have a solid construction or a braided construction.

Figure 18:
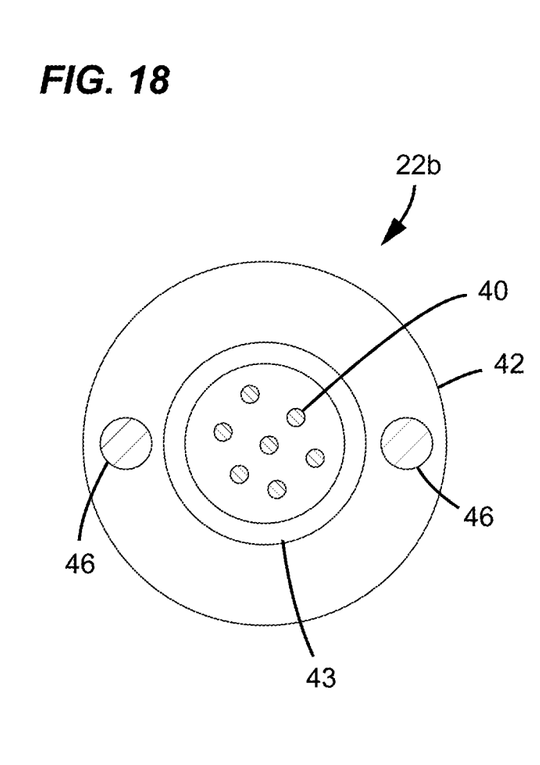
FIG. 18 is a cross sectional view of an example fiber optic cable that can be incorporated as part of the cable assemblies in accordance with the principles of the present disclosure.

The cables 22 also include at least one fiber optic cable 22b (see FIGS. 5-8 and 18). In the depicted cable assembly 20 of FIGS. 5-8, only one fiber optic cable 22b is depicted. In other examples, more than one fiber optic cable may be included in the cable assembly. As best shown at FIG. 18, the fiber optic cable 22b includes a plurality of optical fibers 40 positioned within a cable jacket 42. The optical fibers 40 can optionally be positioned within a buffer tube 43 located inside the cable jacket 42. The fiber optic cable 22b preferably includes at least one strength element 46 for reinforcing the fiber optic cable 22b. In certain examples, more than one strength element 46 can be provided. The strength elements 46 are adapted for reinforcing the fiber optic cable 22b. In certain examples, the strength element or elements are adapted to reinforce the fiber optic cable 22b in tension and/or in compression. In the depicted example, two strength elements 46 are shown positioned on opposite sides of the buffer tube 46. The strength elements 46 can be constructed as reinforcing rods such as rods having a composition that includes a fiber reinforced polymer. In other examples, the strength elements 46 can have a more string-like construction and can include a reinforcing yarn type construction such as Aramid yarn.

It is preferred for the fiber optic cable 22b to include a plurality of optical fibers 40. In certain examples, the fiber optic cable can include 2, 4, 6, 8, 10, 12, 24, 26 or more optical fibers. In the depicted example, the cable jacket 46 has a round cross sectional shape. In other examples, the cable jacket 42 could have a flat construction.

Figure 4:
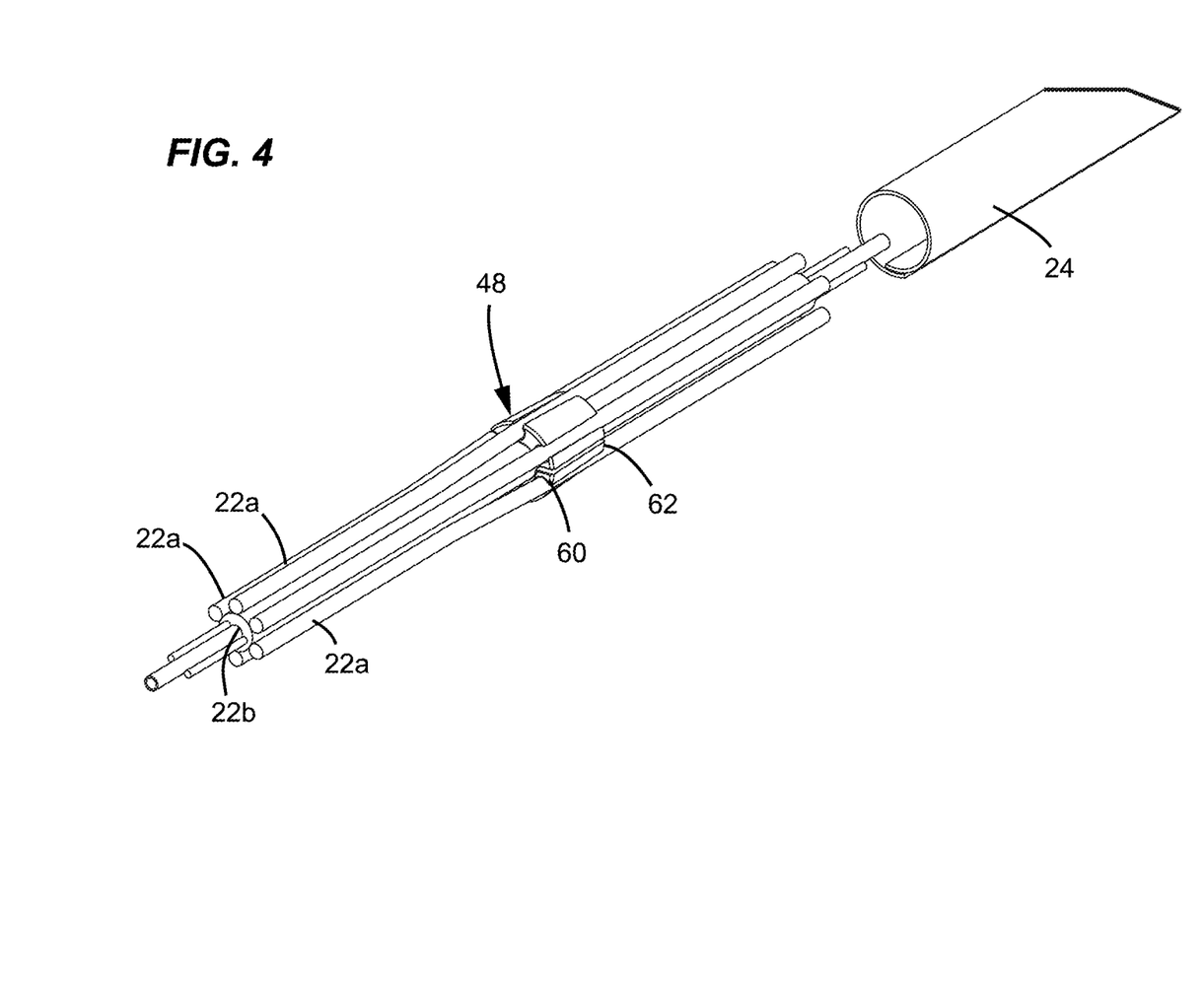
FIG. 4 is an exploded view of the break-out end of FIG. 2.
Figure 5:
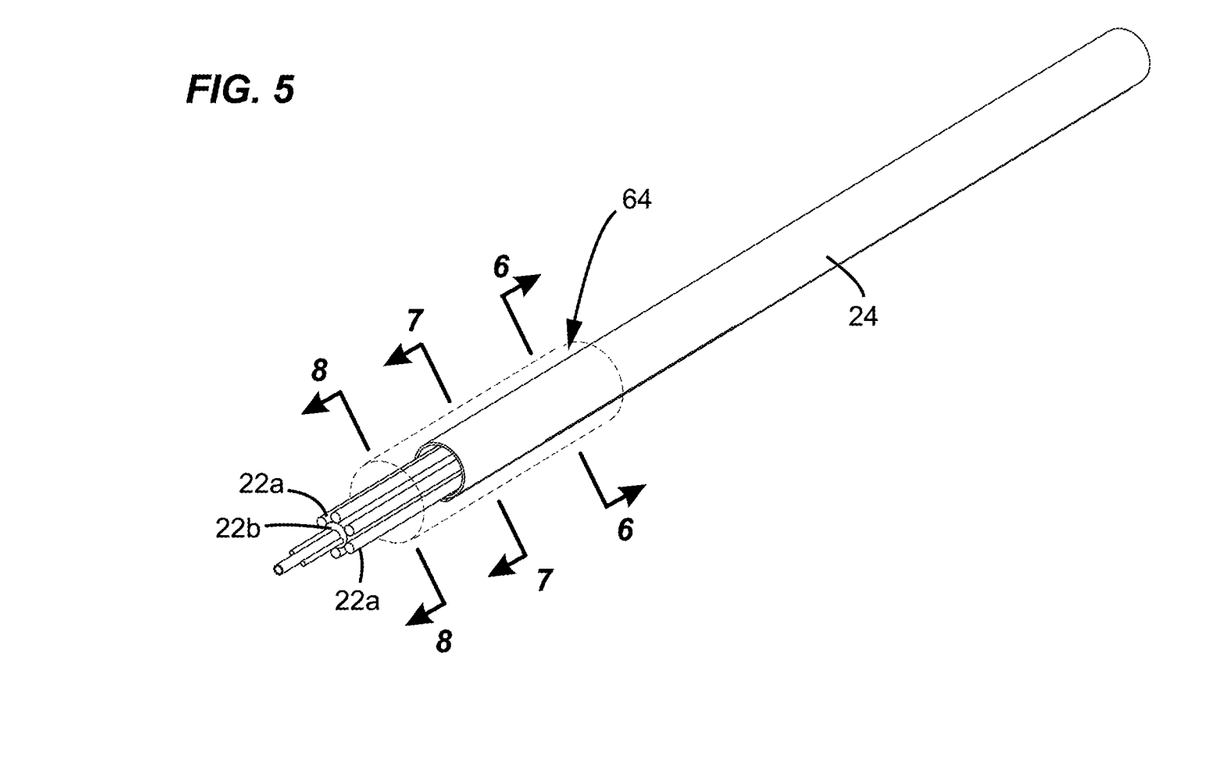
FIG. 5 is another perspective view of the break-out end of FIGS. 2 and 4 with bonding materials shown in phantom line.
Figure 6:
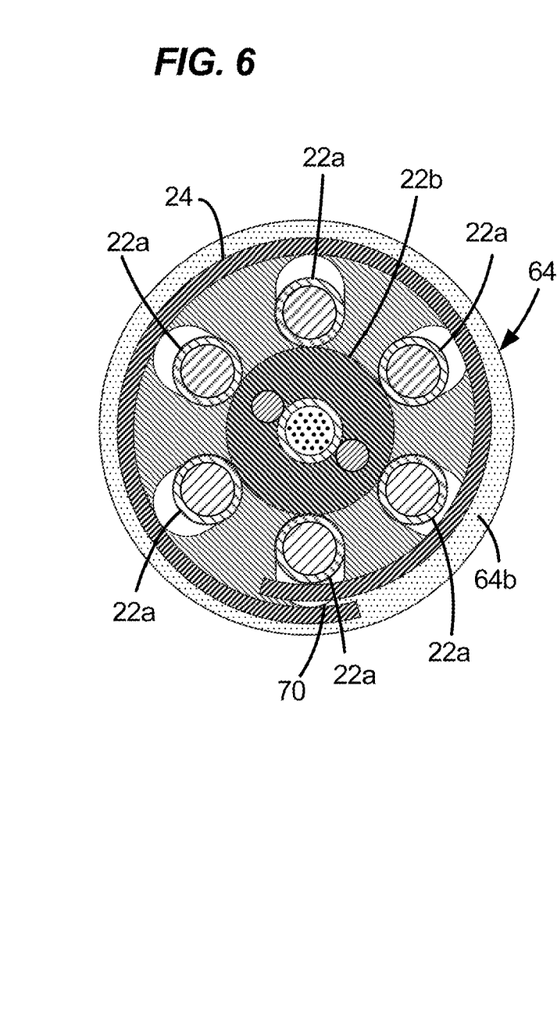
FIG. 6 is a cross sectional view taken along section line 6-6 of FIG. 5, the cross sectional line cuts through a grommet positioned within a sleeve of the cable assembly.
Figure 7:
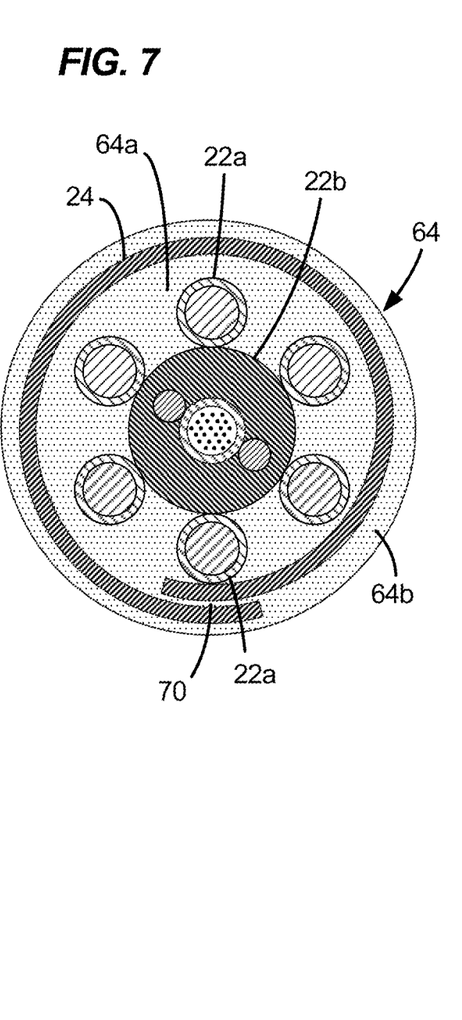
FIG. 7 is a cross sectional view taken along section line 7-7 showing bonding material positioned within the sleeve of the cable assembly which fills void regions between the cables routed through the sleeve.
Figure 8:
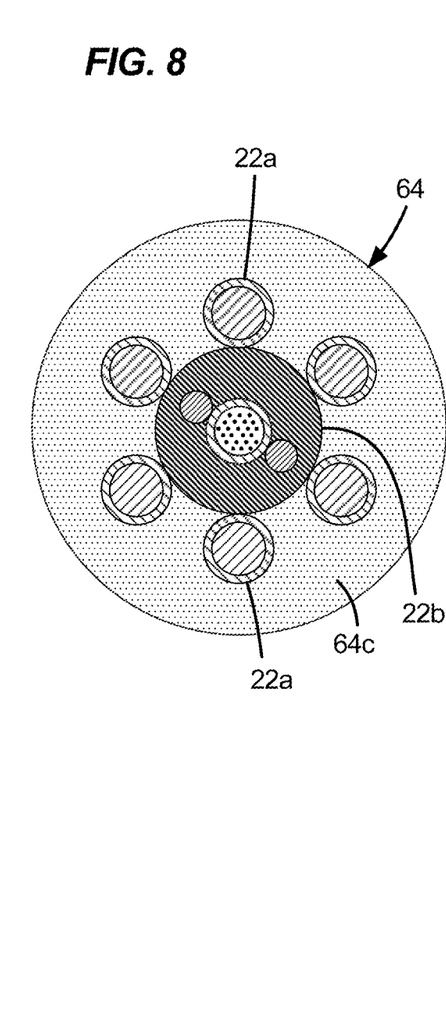
FIG. 8 is a cross sectional view taken along section line 8-8 located outwardly offset in an axial direction from an end of the sleeve of the cable assembly.
Figure 15:
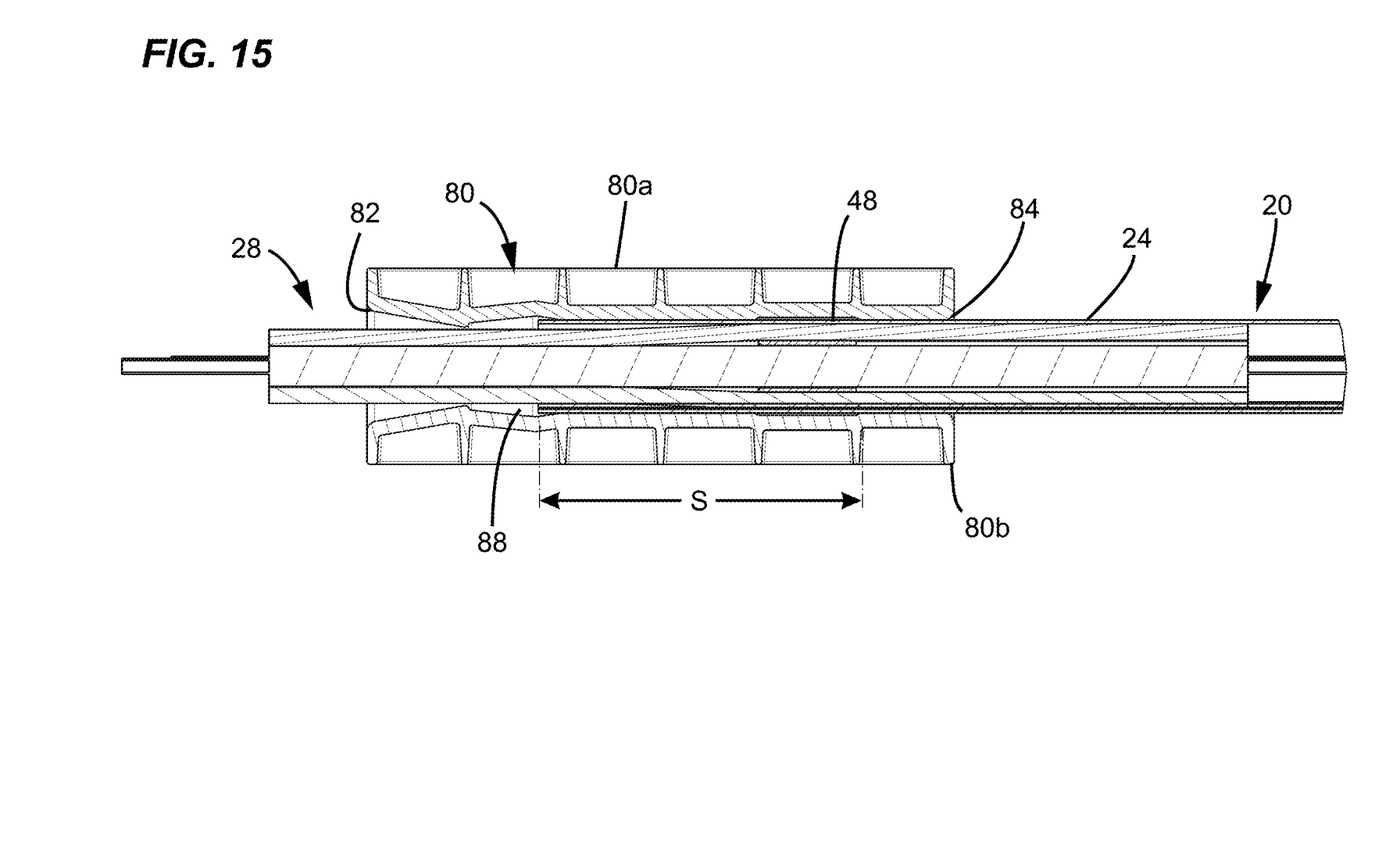
FIG. 15 is a cross sectional view taken along section line 12-12 of FIG. 14.

Referring to the exploded view of FIG. 4, the cable assembly 20 also includes a grommet 48 that receives and positions/organizes the cables 22 within the sleeve 24. As shown at FIG. 15, the grommet 48 is positioned within the sleeve 24 at a location offset from the break-out end 28 of the sleeve 24 by an offset spacing S. It will be appreciated that the grommet 48 functions to position the cables 22 within the sleeve 24 and also forms a dam location within the sleeve 24. The dam location is configured to prevent bonding material from flowing within the sleeve past the grommet 48 in a direction toward the open end 30 of the sleeve 24 during initial application of the bonding material prior to curing of the bonding material.

Figure 9:
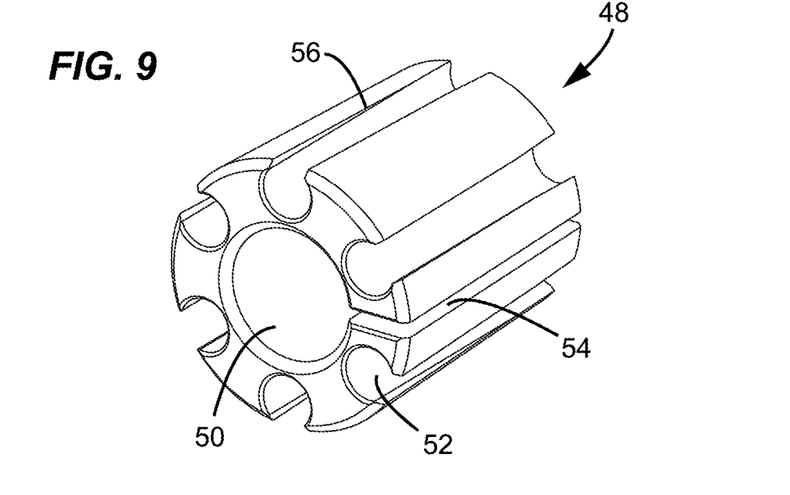
FIG. 9 is a perspective view of a grommet that mounts within the sleeve of the cable assembly adjacent the break-out end of the sleeve.
Figure 11:
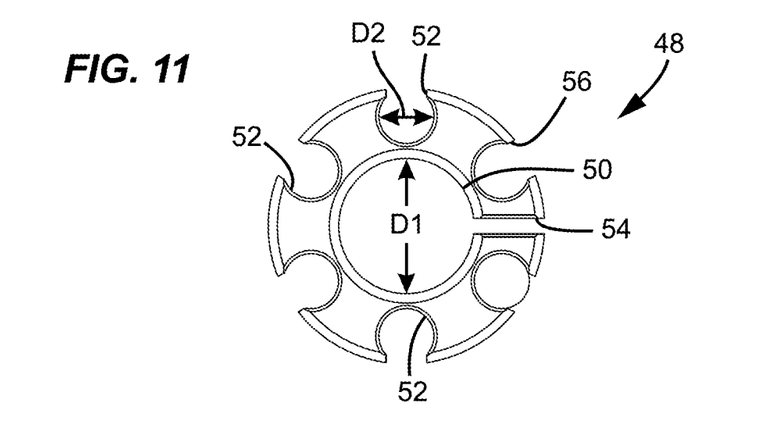
FIG. 11 is an end view of the grommet of FIG. 9.
Figure 12:
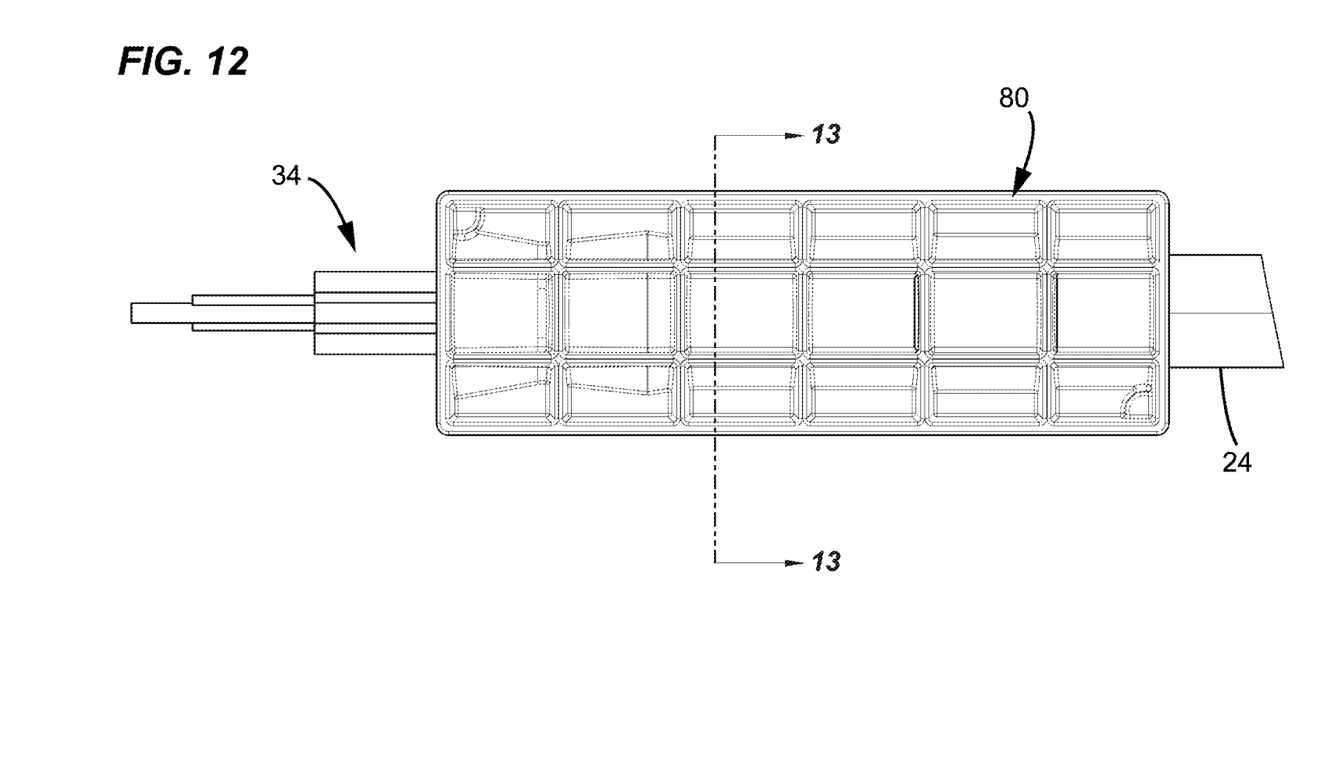
FIG. 12 is a top view showing a mold used for installing the bonding material of the cable assembly at the break-out end of the sleeve of the cable assembly.
Figure 13:
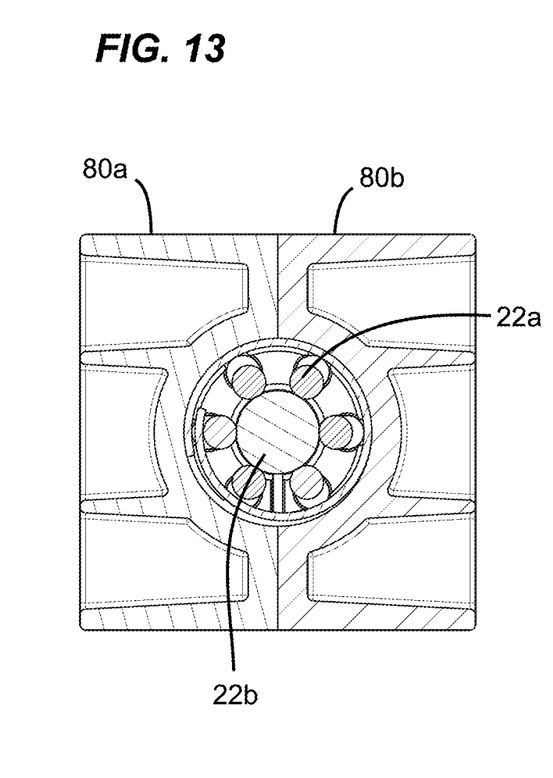
FIG. 13 is a cross sectional view taken along section line 13-13.
Figure 14:
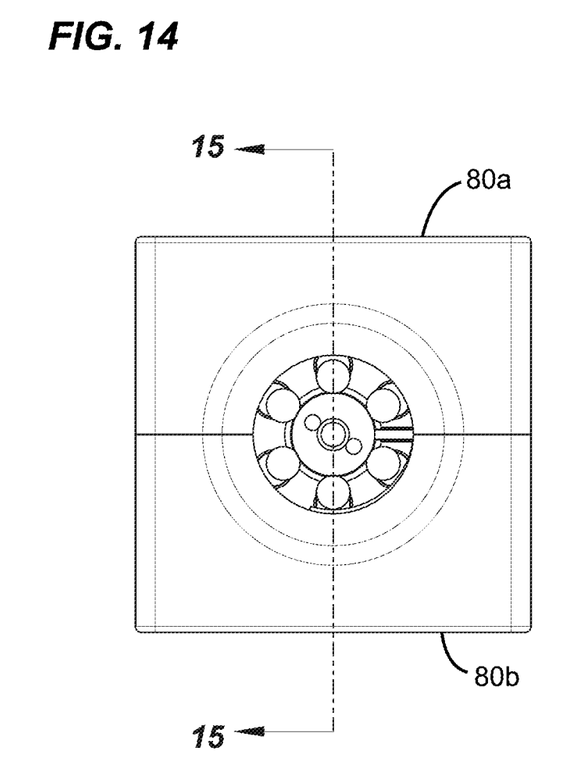
FIG. 14 is an end view of the cable assembly and mold of FIG. 12.

The grommet 48 preferably has a composition that includes rubber. As shown at FIGS. 9 and 11, the grommet 48 includes a fiber optic cable opening 50 positioned at a center of the grommet 48 for receiving the fiber optic cable 22b and a plurality of power cable openings 52 positioned circumferentially around the fiber optic cable opening for receiving the power cables 22a. In the depicted example, the fiber optic cable opening 50 has a first diameter D1 that is larger than a second diameter D2 defined by each of the power cable openings 52. In one example, the first diameter D1 is at least two times as large as the second diameter D2. In this way, the fiber optic cable opening 50 can accommodate the fiber optic cable 22b which has a larger diameter than the diameters of the power cables 22a. In the depicted example, the outer diameter of the fiber optic cable 22b is at least two times as large as the outer diameter of each of the power cables 22a.

As best shown at FIGS. 9 and 11, the grommet 48 defines a side insertion slot 54 corresponding to the fiber optic cable opening 50 and also defines side insertion slots 56 corresponded to each of the power cable openings 52. The side insertion slot 54 allows the fiber optic cable 22b to be laterally inserted into the fiber optic cable opening 50 and the side insertion slots 56 allow the power cables 22b to be laterally inserted into the power cable openings 52.

Figure 10:
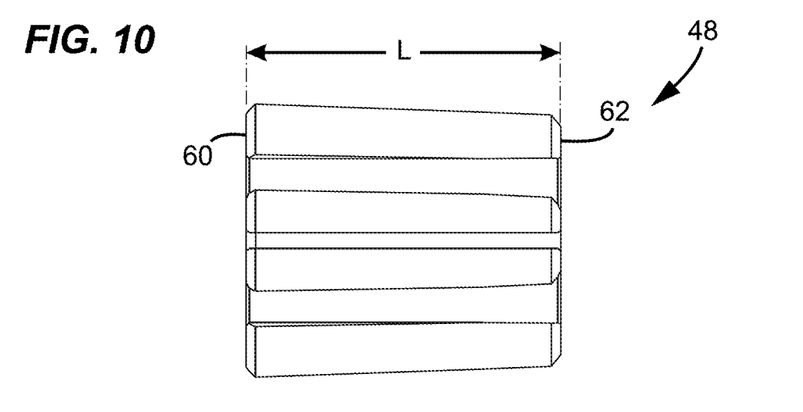
FIG. 10 is a side view of the grommet of FIG. 9.

Referring to FIG. 10, the grommet 48 has an axial length L. The fiber optic cable opening 50 and the power cable openings 52 extend along the axial length L. The side insertion slots 54, 56 also extend along the axial length L. The grommet 48 is configured such that an exterior of the grommet 48 tapers along the axial length L from a major end 60 to a minor end 62 of the grommet 48. When the grommet 48 is positioned within the interior of the sleeve 24, the major end 60 of the grommet faces toward the break-out end 28 of the sleeve 24 and the minor end 62 of the grommet 48 faces away from the break-out end 28. As shown at FIG. 15, the major end 60 of the grommet 48 functions to form the dam location of the cable assembly 20.

The cable assembly 20 further includes a bonding material 64 (see FIGS. 2 and 5-8) that at least partially fills a region of the sleeve 24 located between the dam location defined by the grommet 48 and the break-out end 28 of the sleeve. In certain examples, the bonding material 64 bonds the fiber optic cable 22b, the power cables 22a and the grommet 48 relative to each other and relative to the sleeve 24. In certain examples, the bonding material can have a composition that includes a curable material such as epoxy. In certain examples, the bonding material 64 includes an inner portion 64a positioned within the sleeve 24 that fills void regions between the cables 22 and bonds the cables 22 to the sleeve 24 (see FIG. 7). The bonding material 64 also includes an outer circumferential portion 64b that circumferentially surrounds an exterior of the sleeve 24 (see FIGS. 6 and 7). The bonding material 64 also includes an outer axial portion 64c (see FIGS. 2, 5 and 8) that extends axially outwardly from the break-out end 28 of the sleeve 24 and that is adapted for providing bend protection to the cables 22 adjacent the break-out end 28 of the sleeve 24. In certain examples, the outer axial portion 64c can have a tapered construction and can form a tapered boot. In certain examples, the cured bonding material 64 has a resilient construction that can flex in response to side loading from the cables 22.

In certain examples, the sleeve 24 has an open configuration at its open end 30. By open configuration it is meant that the cables 22 are not bonded or otherwise secured to the end 30, and the end is not plugged. In this way, the end 30 of the assembly can readily be cut to length as needed in the field.

In certain examples, the sleeve 24 can have a mesh construction and can include a slit 70 that extends along the length of the sleeve 24 from the break-out end 28 to the open end 30. The sleeve 24 can have a resilient construction that biases the slit 70 toward a closed position. The slit 70 allows the cables 20 and the grommet 48 to be laterally loaded into the interior of the sleeve 24. In certain examples, the mesh construction of the sleeve 24 allows the bonding material 64 to wick or otherwise penetrate laterally through the thickness of the sleeve 24 when the bonding material is initially applied/installed within the sleeve 24 (e.g., via a molding process).

It is preferred for the bonding material 64 to initially be applied to the cable assembly 20 by a molding process. For example, FIGS. 12-15 depict an example mold 80 suitable for forming the bonding material to a desired shape with respect to the sleeve 24. The mold 80 mounts over the break-out end 28 of the sleeve 24 and the cables 22 extend outwardly axially beyond the mold 80. The mold can include two half pieces 80a, 80b that mate together with the sleeve 24 positioned between the mold pieces 80a, 80b. The mold 80 has an open end 82 and a closed end 84. The closed end 84 fits tightly about the sleeve and is therefore closed when the mold is mounted over the sleeve. With the mold 80 in place over the break-out end 28 of the sleeve 24, the bonding material 64 can be poured through the open end 82 of the mold thereby allowing the bonding material to fill the void area within the interior of the sleeve 24 up to the grommet 48. The interior of the mold 80 also is slightly larger than the exterior of the spool 26 thereby allowing a portion of the bonding material to flow about the exterior of the sleeve 24 to form the outer circumferential portion 64b. The interior of the mold 80 further includes a tapered portion 88 that extends axially beyond the break-out end 28 of the sleeve 24 for forming the outer axial portion 64c of the bonding material. Once the bonding material 64 has been poured into the mold 80, the bonding material preferably is allowed to cure. After curing the mold 80 is removed. In other examples, other types of molding process such as injection molding can be utilized. The molding process allows the inner portion 64a, the outer circumferential portion 64b and the outer axial portion 64c of the bonding material 64 to all be formed together as a unitary molded piece.

In certain examples, the break-out portion 64 of the cables 22 extend axially outwardly from the break-out end 28 through the bonding material of the sleeve 24 and are individually movable relative to one another. In certain examples, the break-out portions 34 each have a length in the range of 3 to 12 feet. In will be appreciated that the ends of the break-out portions 34 can be connectorized or non-connectorized. With regard to the fiber optic cable, the optical fibers can be terminated by multi-fiber connectors (e.g., duplex connectors, MPO connectors, etc.) or single fiber connectors. It will be appreciated that the fiber optic connectors can be either hardened or non-hardened.

Figure 16:
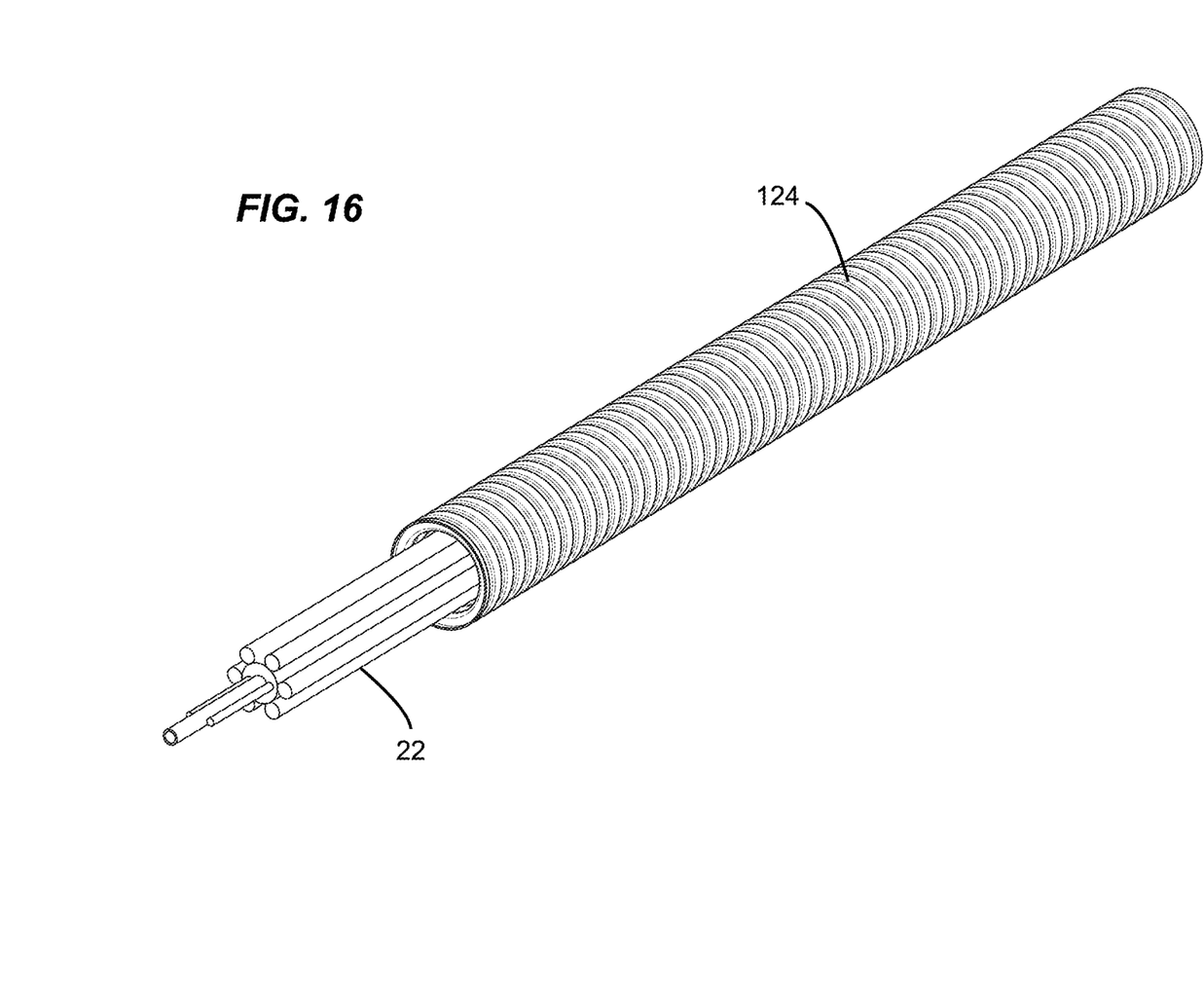
FIG. 16 illustrates an alternative sleeve that can be incorporated into cable assemblies in accordance with the principles of the present disclosure.
Figure 17:
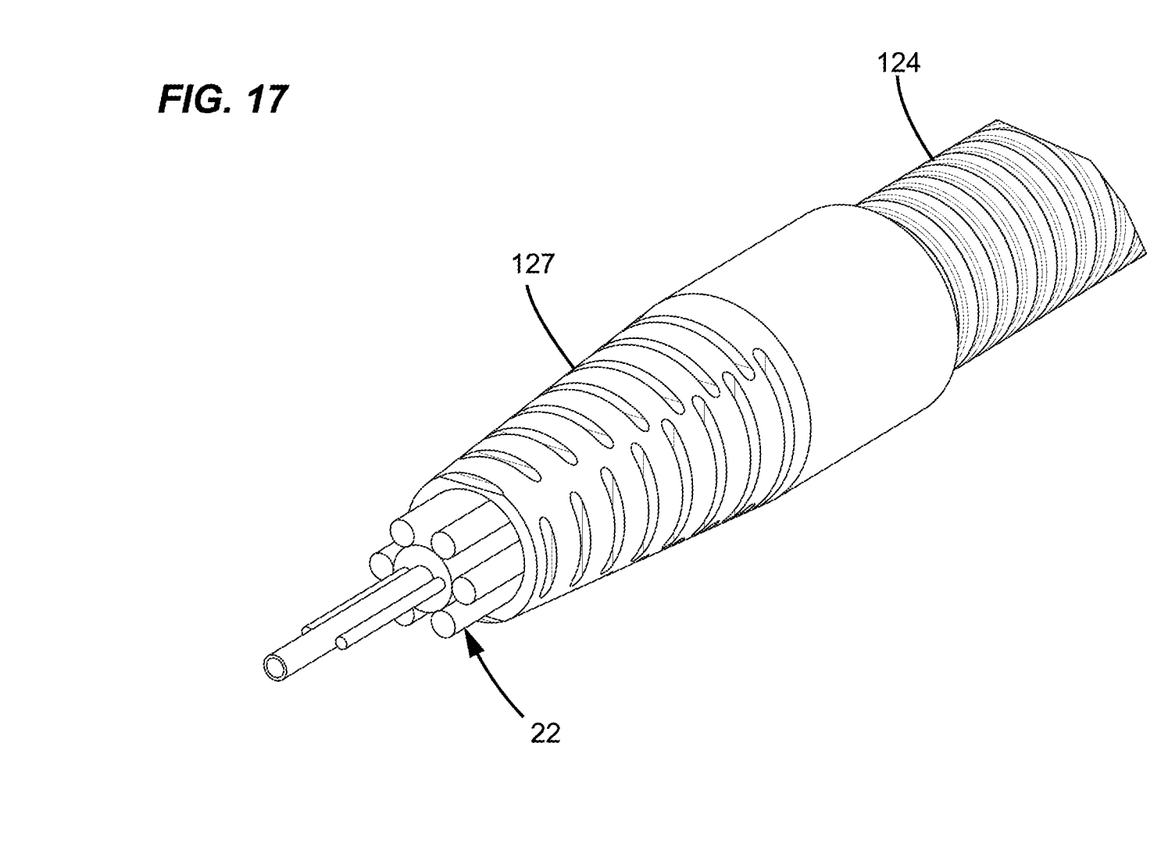
FIG. 17 depicts an alternative boot that can be utilized with the sleeve of FIG. 16.

FIG. 16 depicts an alternative sleeve 124 for surrounding the cables 22. The sleeve 124 is constructed as a corrugated plastic tube. In the depicted example, the sleeve 124 does not have a longitudinal slot. Therefore, for the sleeve 124 of FIG. 16, the cables 22 are required to be axially loaded into the interior of the sleeve 124. FIG. 17 depicts an example boot 127 that can be mounted over the break-out end of the sleeve 124 to provide bend radius protection to the cables 22. In the depicted example, the boot 127 is a separate piece that mounts over the end of the sleeve 124. In other examples, the boot 127 can be unitarily formed with bonding material that at least partially fills a portion of the interior of the sleeve 124 and fills void regions between the cables 22 within the sleeve 124.

What is claimed is:

1. A cable assembly comprising:
   a sleeve extending along a length between opposite first and second ends;
   a grommet disposed within the sleeve at a location inwardly offset along the length of the sleeve from the first end of the sleeve, the grommet being located closer to the first end of the sleeve than to the second end of the sleeve, the grommet being a separate piece from the sleeve, the grommet extending along an axis between opposite first and second ends, the axis extending along the length of the sleeve, the grommet defining a plurality of cable openings positioned circumferentially around the axis;
   a plurality of cables extending through the sleeve along the length, each of the cables extending beyond the first end of the sleeve, each of the cables being positioned within one of the cable openings defined by the grommet;
   a cured body of bonding material surrounding the first end of the sleeve so that the first end of the sleeve terminates within the cured body of bonding material, the cured body of bonding material also surrounding a portion of the plurality of cables as the plurality of cables extend outwardly beyond the first end of the sleeve, the cured body of bonding material at least partially filling an interior of the sleeve between the grommet and the first end of the sleeve, the cured body of bonding material being bonded to both the sleeve and the cables of the plurality.

2. The cable assembly of claim 1, wherein the plurality of cables includes a power cable.

3. The cable assembly of claim 2, wherein each cable of the plurality of cables is a power cable.

4. The cable assembly of claim 2, further comprising a fiber cable extending through the sleeve, through the grommet, and through the layer of bonding material.

5. The cable assembly of claim 4, wherein the fiber cable extends through a center of the grommet along the second axis so that the cable openings surround the fiber cable.

6. The cable assembly of claim 1, further comprising another cable extending through the sleeve and through the grommet so that the cable openings of the grommet surround the another cable.

7. The cable assembly of claim 6, wherein the grommet defines an opening through which the another cable passes, the opening having a first diameter that is larger than a second diameter defined by each of the cable openings that are positioned circumferentially around the axis.

8. The cable assembly of claim 7, wherein the first diameter is at least two times as large as the second diameter.

9. The cable assembly of claim 1, wherein the bonding material is epoxy.

10. The cable assembly of claim 1, wherein the sleeve defines an axial slit extending along the length of the sleeve.

11. The cable assembly of claim 1, wherein the second end of the sleeve has an open configuration.

12. The cable assembly of claim 1, wherein the grommet has a composition that includes rubber.

13. The cable assembly of claim 1, wherein the bonding material penetrates through a mesh construction to form the cured body.

14. The cable assembly of claim 13, wherein the cured body of the bonding material forms a tapered boot.

15. The cable assembly of claim 1, wherein the cured body of the bonding material forms a cable bend protection feature.

16. The cable assembly of claim 1, wherein the cured body of the bonding material is formed together as a unitary molded piece.

17. The cable assembly of claim 1, wherein the grommet forms a dam location within the sleeve for limiting a distance the bonding material can flow within the sleeve during application of the bonding material to form the cured body of bonding material.

18. The cable assembly of claim 1, wherein the grommet defines cable side-insertion slots corresponding to the cable openings.

19. The cable assembly of claim 1, wherein the grommet tapers as the grommet extends along the axis.

20. The cable assembly of claim 1, wherein the sleeve is coiled on a spool such that that cable assembly can be paid off the spool by pulling on the cable assembly adjacent the first end of the sleeve causing the spool to rotate as the cable assembly is paid off from the spool.

21. The cable assembly of claim 1, wherein the sleeve is packaged in a box such that the cable assembly can be paid out from the box by pulling on the cable assembly adjacent the first end of the sleeve.

* * * * *